United States Patent
Ziskovsky et al.

(10) Patent No.: US 9,562,603 B2
(45) Date of Patent: Feb. 7, 2017

(54) DRIVE ASSEMBLY WITH A ROTATING HOUSING ATTACHED TO AN OUTPUT INTERFACE

(71) Applicant: DEERE & COMPANY, Moline, IL (US)

(72) Inventors: Darren J. Ziskovsky, Independence, KS (US); Steven R. Fliearman, Coffeyville, KS (US); Kyle K. McKinzie, Altamont, KS (US); Jeffrey S. Turner, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/754,515

(22) Filed: Jun. 29, 2015

(65) Prior Publication Data

US 2016/0377162 A1    Dec. 29, 2016

(51) Int. Cl.
*F16H 57/08*    (2006.01)
*F16H 57/02*    (2012.01)
*B60K 17/08*    (2006.01)
*F16H 1/32*    (2006.01)

(52) U.S. Cl.
CPC .............. *F16H 57/02* (2013.01); *B60K 17/08* (2013.01); *F16H 1/32* (2013.01); *F16H 2001/324* (2013.01); *F16H 2057/02017* (2013.01)

(58) Field of Classification Search
CPC ...... F16H 57/02; F16H 1/32; F16H 2001/324; F16H 2057/02017; B60K 17/08; B60K 1/00
See application file for complete search history.

(56) References Cited

U.S. PATENT DOCUMENTS

| | | | |
|---|---|---|---|
| 3,414,096 A | 12/1968 | Reed | |
| 5,995,895 A | 11/1999 | Watt et al. | |
| 7,975,789 B2 * | 7/2011 | Murata | B60G 7/005 180/65.51 |
| 8,025,116 B2 * | 9/2011 | Rogg | B60K 7/0007 180/65.51 |
| 8,182,387 B2 * | 5/2012 | Fujii | F16H 57/082 475/220 |
| 8,287,421 B2 * | 10/2012 | Ciszak | F03D 11/02 475/331 |

(Continued)

FOREIGN PATENT DOCUMENTS

SU           521412         7/1976

*Primary Examiner* — David J Hlavka

(57) ABSTRACT

A drive assembly is disclosed, including a housing cylinder with a cap end, an attachment end with a first attachment surface, and gear teeth disposed around an inner circumference to form at least one ring gear. A planetary gear set may be surrounded by the housing cylinder and includes at least one sun gear and at least one set of planet gears. An output interface may include an interface body and an annular attachment lip with a second attachment surface. The housing cylinder may be attached to the attachment lip for operation of the drive assembly via the second attachment surface contacting the first attachment surface, with the cap end of the housing cylinder extending axially past an axial end of the attachment lip. Rotational power may be transmitted from the planetary gear set to the output interface via the gear teeth and the contact between the attachment surfaces.

29 Claims, 5 Drawing Sheets

(56) References Cited

U.S. PATENT DOCUMENTS

| | | | | |
|---|---|---|---|---|
| 8,403,794 B2* | 3/2013 | Suzuki | ................. | B60K 7/0007 475/179 |
| 8,505,658 B2* | 8/2013 | Wargh | ................. | B60K 7/0007 180/65.51 |
| 8,684,879 B2* | 4/2014 | Nakamura | ................ | F16H 1/32 475/179 |
| 9,121,488 B2* | 9/2015 | Magiera | ............... | B60K 17/043 |
| 2005/0236198 A1* | 10/2005 | Jenkins | ................ | B60K 7/0007 180/65.51 |
| 2013/0009450 A1* | 1/2013 | Suzuki | ................. | B60K 7/0007 301/6.5 |
| 2013/0119748 A1* | 5/2013 | Yamamoto | ........... | B60K 7/0007 301/6.5 |

\* cited by examiner

DRIVE ASSEMBLY WITH A ROTATING HOUSING ATTACHED TO AN OUTPUT INTERFACE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive assemblies, including for transmitting rotational power from a motor to an output hub, via the attachment of the output hub to a housing cylinder with an integrated ring gear.

BACKGROUND OF THE DISCLOSURE

In various applications, a drive assembly may be utilized to provide rotational power to various components. In tracked vehicles, for example, a final drive assembly may be mounted to a frame of the vehicle in order to provide rotational power, at an output hub of the drive assembly, to drive the tracks of the vehicles and thereby move the vehicles over terrain. Such a drive assembly (and others) may include motors for providing rotational power, and various gears for adjusting the speed of the rotational power for output at the output hub.

Known designs of drive assemblies may utilize significant amounts of material to provide a power-transmitting attachment between a gear set and an output hub. Further, known designs may sometimes require relatively expensive manufacturing techniques in order to form appropriate contours (e.g., gear teeth) on various parts of the drive assemblies. Accordingly, it may be useful to provide a drive assembly with an improved arrangement for transmission of power between a power source, such as a motor, and an output hub.

SUMMARY OF THE DISCLOSURE

A drive assembly is disclosed for transmission of power from a power source, such as a motor, to an output interface.

According to one aspect of the disclosure, a housing cylinder includes a cap end, an attachment end with a first attachment surface, and gear teeth disposed around an inner circumference to form at least one ring gear. A planetary gear set may be surrounded by the housing cylinder and includes at least one sun gear and at least one set of planet gears. The planet gears may be supported by at least one planet gear carrier, rotated by the at least one sun gear and meshed with the at least one ring gear. An output interface may include an annular attachment lip with a second attachment surface. The housing cylinder may be attached to the attachment lip for operation of the drive assembly via the second attachment surface contacting the first attachment surface, with the cap end of the housing cylinder extending axially past an axial end of the attachment lip. Rotational power may be transmitted from the planetary gear set to the output interface via the gear teeth and contact between the attachment surfaces.

In certain embodiments, one of the attachment surfaces may include a self-cutting spline interface. The attachment lip or the attachment end of the housing cylinder may include a chamfer or groove to receive debris generated by formation of a splined connection by the self-cutting spline interface. The contact between the first attachment surface of the housing cylinder and the second attachment surface of the attachment lip may be provided by an interference fit connection or a shrink fit connection between the attachment end of the housing cylinder and the attachment lip.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
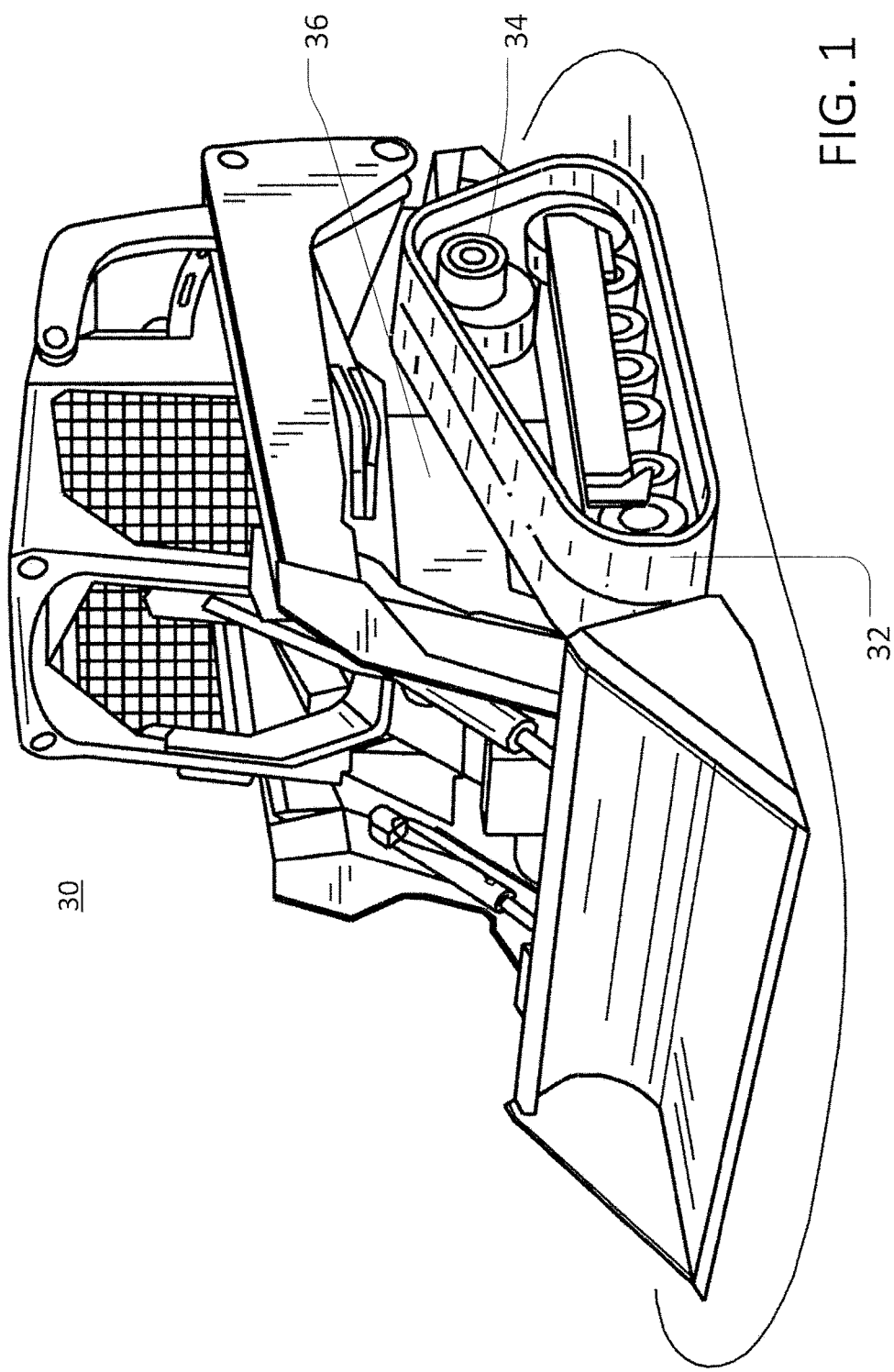
FIG. 1 is perspective view of an example vehicle with which a drive assembly according to the present disclosure may be implemented.

The following describes one or more example embodiments of the disclosed drive assembly, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft.

Also as used herein, "radially" aligned may refer to two components that are both disposed along a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

As also noted above, known designs for drive assemblies may exhibit various characteristics that result in relatively large manufacturing costs for the drive assemblies. For example, a prior art drive assembly (not shown) may include a motor mounted at a first end of the drive assembly, and a housing at a second end of the drive assembly. The housing may be integrally formed with a hub, which may be attached to an external device, such as a wheel or sprocket, in order to provide rotational power from the motor to the external device. A planetary gear set in communication with the motor may be disposed within the housing in order to provide a speed reduction of various ratios to rotational power received from the motor. The planetary gear set may engage the housing via a ring gear, which may be press fit into, or welded to, the housing. In this way, rotational power from the motor may be transmitted through the planetary gear set to the housing in order to rotate the hub.

In known designs, the housing may be integrally formed with the hub and extends from the hub to the second end of the drive assembly. At the second end of the drive assembly, an end cap may be attached to the housing in order to close off the interior of the housing and thereby enclose and protect the planetary gear set and other components. As a result of this configuration, the housing may generally exhibit a relatively long and heavy profile, with the planetary gear set (including the ring gear) and the end cap being radially aligned with (and contained within) the housing.

The configuration of such a drive assembly (and similar configurations) may introduce various costs to manufacturing. For example, a relatively large quantity of the material may be required for the housing to extend fully from the hub to the end cap. This may impose relatively significant material costs on the manufacture of the drive assembly. As another example, a spacer may be required in order to hold the ring gear in place within the housing. The spacer may also impose relatively significant material costs on the manufacture of the drive assembly.

Aside from the amount of material required for such a housing (and in similar configurations), the expected loads and stresses on the housing may generally require the use of relatively expensive materials and manufacturing techniques for the formation of the housing (and related components).

Other issues may arise beyond material costs. For example, due to the configuration of such a housing, and the location of the ring gear, the housing may require relatively precise machining in order to ensure an appropriate fit with the ring gear. Further, it may be necessary to form the teeth of the ring gear by way of relatively expensive and time-consuming manufacturing methods, such as individual shaper cuts.

The disclosed drive assembly may address various of the issues noted above, as well as provide various additional benefits. Generally, in place of the extended housing of known configurations described above (or similar other features), the disclosed drive assembly may include a relatively short attachment lip extending from the output hub (or other output interface). A separate housing may be formed with an integrally (or similarly) formed ring gear interface around an internal circumference of the housing. The housing may then be press fit, shrink fit, or otherwise attached to the lip. Gears of a gear set contained by the housing may mesh with the ring gear interface in order to deliver rotational power to the housing from a motor (or other power source), and the attachment of the housing to the attachment lip may allow that power to be transmitted to the output hub for use by an external device.

Generally, by replacing the extended housing of known configurations (or similar other features) with an attachment lip for attaching a separate housing to an output interface, a significant amount of material and expense may be saved in manufacturing the drive assembly. Further, due to the separate housing and lip configuration, more inexpensive manufacturing techniques, such as broaching, may be utilized to form the ring gear interface for the housing.

The disclosed drive assembly may be utilized with an example vehicle 30, as shown in FIG. 1. As depicted, the vehicle 30 is a compact track loader with ground-engaging tracks 32. An example drive assembly 34 is configured as a final drive assembly that is mounted to a frame 36 of the vehicle 30 in order to provide motive power to the tracks 32.

It will be understood that the depicted vehicle 30 is presented as an example only, and that the disclosed drive assembly (e.g., the drive assembly 34) may be utilized with other vehicles (or other machines). Further, it will be understood that the disclosed drive assembly may be utilized as a final drive assembly (e.g., as depicted for the drive assembly 34) for providing motive power to a ground-engaging element (e.g., wheels, etc.) of a vehicle, or may be utilized to provide rotational power to other types of devices.

Figure 2:
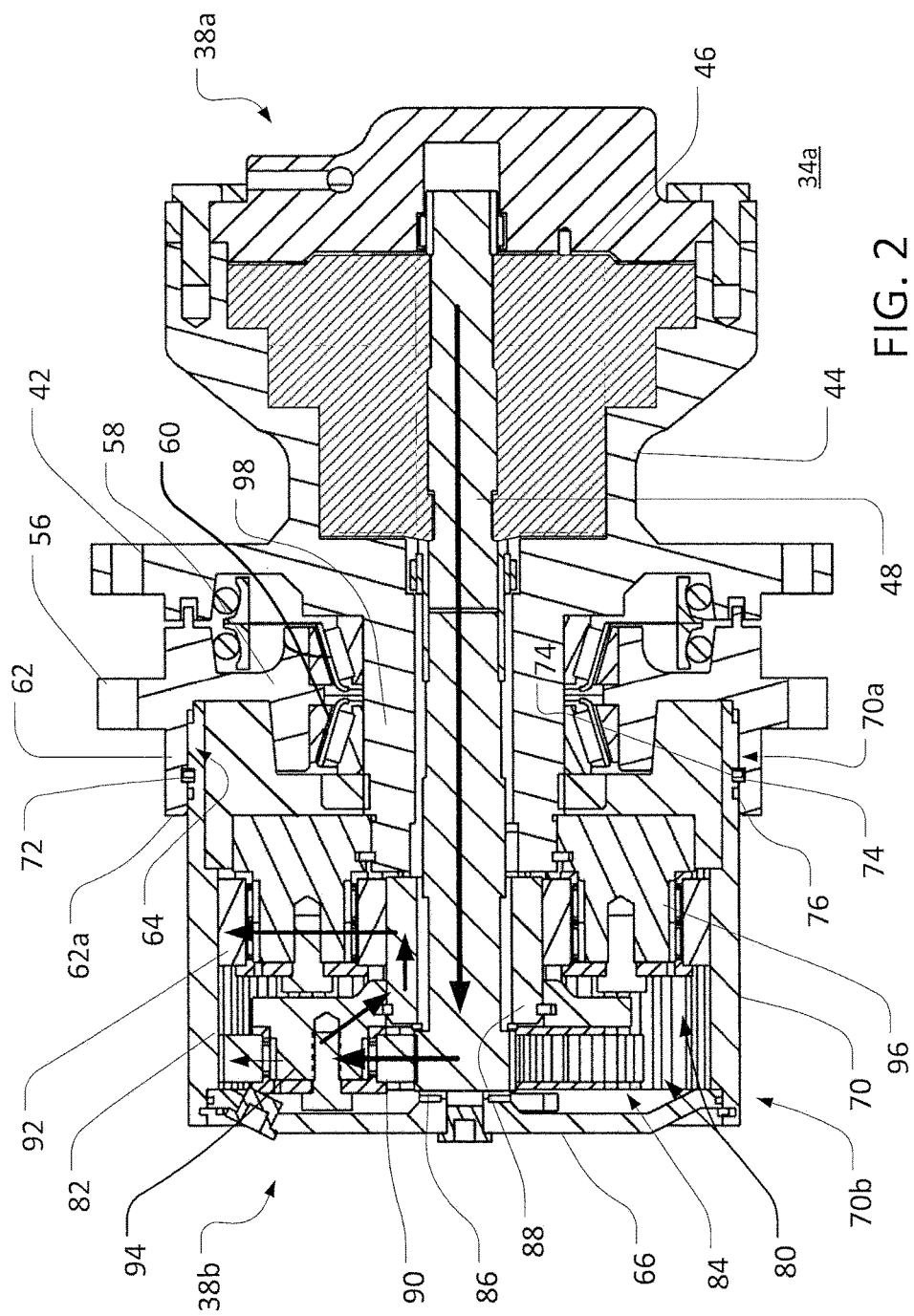
FIG. 2 is a side sectional view of an example drive assembly according to the present disclosure, for use with the vehicle of FIG. 1.

Referring also to FIG. 2, an example configuration of the drive assembly 34 is presented as a drive assembly 34*a*. Various components (or assemblies) of the drive assembly 34*a* may generally exhibit radial symmetry, such that for these components the sectional view depicted in FIG. 2 may represent a view of any number of diametric planes through the drive assembly 34*a*. In certain embodiments, the disclosed drive assembly may exhibit various radial asymmetries.

As depicted, the drive assembly 34*a* includes a mounting hub 42 configured for attachment to the frame 36 of the vehicle 30. As such, the drive assembly 34*a* may be utilized as a final drive assembly for driving the tracks 32 of the vehicle 30. In certain embodiments, the drive assembly 34*a* (or other similar drive assemblies) may be utilized as a final drive assembly for other vehicles, or as a source of rotational power for various other vehicles or machines.

The mounting hub 42 is included as part of a larger mounting structure 44 for the drive assembly 34*a*, which may be generally configured to remain relatively stationary during operation of the drive assembly 34*a*. A motor 46 may be attached to the mounting structure 44 (and, thereby, to the mounting hub 42) at one axial end 38*a* of the drive assembly 34*a* (axially inner end in FIG. 1), such that the motor 46 may be held in an appropriately stationary orientation for delivery of rotational power to various external devices (e.g., the tracks 32 of FIG. 1). In FIG. 2, the motor 46 is configured as a hydraulic motor with a brake assembly (not shown), and an output shaft 48 extending along a drive axis towards another axial end 38*b* of the drive assembly 34*a* (axially outer end in FIG. 1). In other embodiments, other configurations may be possible. For example, in certain embodiments, the motor 46 may be configured as an electric motor. In certain embodiments, a non-motor power source may be utilized. For example, the mounting structure 44 may be configured to receive a power input (e.g., an input shaft) from an external power source such as an engine.

The drive assembly 34*a* may further include an output interface. As depicted, the output interface is configured as an output hub 56, although other configurations may be possible. Generally, the output hub 56 includes a hub body 58, which may extend within the drive assembly 34a and be mounted for rotation about the drive axis of the output shaft 48 by means of a bearing arrangement 60, here shown as a double-row tapered roller bearing, supported by a cylindrical neck 98 of the mounting structure 44 (described in further detail below) extending toward the axial end 38b of the drive assembly 34a. The output hub 56 also includes an annular attachment lip 62, which extends from the hub body 58, towards the axial end 38b of the drive assembly 34a, and has a terminal axial end 62a. Generally, the attachment lip 62 may define an undercut 64, such that an open space is provided radially inside the attachment lip 62.

As depicted, the output hub 56 is configured to engage (directly or indirectly) the tracks 32 of the vehicle 30, such that rotation of the output hub 56 may drive movement of the tracks 32 and, thereby, movement of the vehicle 30. In other embodiments, other output interfaces may be utilized to engage with the tracks 32 or other external devices.

The drive assembly 34a may further include a housing, such as the housing cylinder 70. Generally, the housing of the disclosed drive assembly may have an end region configured to engage with an attachment lip of the relevant output interface, such that rotational power may be transmitted from the housing to the output interface via co-rotation (i.e., rotation in unison) of the housing and the output interface. As depicted, for example, the housing cylinder 70 includes an end region defined by a hub end 70a, which is configured to overlap and engage only the annular attachment lip 62 of the output interface and to attach to the output hub 56 only via the attachment lip 62. The housing cylinder 70 also includes a cap end 70b, which is at an opposite end of the housing cylinder 70 from the hub end 70a, to which an end cap 66 is attached.

The hub end 70a of the housing cylinder 70 may be configured to attach to the attachment lip 62 in various ways, as discussed in greater detail below. In certain embodiments, an inner diameter of the attachment lip 62 and an outer diameter of the hub end 70a of the housing cylinder 70 may be configured such that an appropriately strong diametral interference (e.g., press) fit may be formed between the housing cylinder 70 and the output hub 56, when the hub end 70a of the housing cylinder 70 is inserted into the undercut 64 (i.e., is surrounded by the attachment lip 62). In certain embodiments, shrink fit techniques may be utilized. For example, the attachment lip 62 may be expanded radially outward through heating, and the hub end 70a of the housing cylinder 70 may be inserted into the undercut 64. As the attachment lip 62 cools, an appropriately strong attachment may be thereby formed between the housing cylinder 70 and the output hub 56. In certain embodiments, the attachment lip 62 or the housing cylinder 70 may be manufactured with self-cutting splines (see, e.g., FIGS. 6A and 6B), such that a splined connection between the housing cylinder 70 and the output hub 56 may be formed when the hub end 70a of the housing cylinder 70 is inserted into the undercut 64.

In certain embodiments, a snap ring 72 (or other retaining ring) may be seated within grooves 74 in the attachment lip 62 and the hub end 70a of the housing cylinder 70. For example, the snap ring 72 may be captured within the grooves 74 during a shrink fit operation for attaching the housing cylinder 70 to the attachment lip 62. In this way, the snap ring 72 (or other retaining ring) may provide axial retention force with respect to the attachment of the output hub 56 and the housing cylinder 70, with the direct engagement of the facing surfaces of the attachment lip 62 and the hub end 70a of the housing cylinder 70 carrying torque loads during operation of the drive assembly 34a. In certain embodiments, an o-ring 76 (or other seal) may be utilized in order to provide additional sealing between the attachment lip 62 and the housing cylinder 70.

As depicted, the undercut 64 defined by the attachment lip 62 provides a point of insertion for the hub end 70a of the housing cylinder 70. The housing cylinder 70 may accordingly be attached to the mounting hub 42 by inserting the hub end 70a of the housing cylinder 70 into the undercut 64, with the attachment lip 62 generally surrounding (i.e., being radially aligned with and outside of) the hub end 70a of the housing cylinder 70. In certain embodiments, a somewhat reversed configuration (not shown) may be utilized. For example, the hub end 70a of the housing cylinder may be configured to slide over (i.e., radially outside of) the attachment lip 62 in order to attach the housing cylinder 70 to the output hub 56. As such, in certain embodiments, the output hub 56 may be attached to the housing cylinder 70 with the hub end 70a of the housing cylinder generally surrounding (i.e., being radially aligned with and outside of) the attachment lip 62. In such a configuration, similar attachment means and other considerations discussed above may apply, but with an inner surface of the housing cylinder 70 contacting an outer surface of the attachment lip 62, rather than vice versa.

In certain embodiments, the output hub 56 and the housing cylinder 70 may be formed from different materials, or may be formed in different ways. For example, the output hub 56 may be formed from cast iron, whereas the housing cylinder 70 may be formed from steel (or other metal) tubing. This may result in relatively significant reduction in costs as compared to known drive assembly designs.

Rotational power may be transmitted in various ways from the motor 46 to the housing cylinder 70 and thereby, via the attachment between the attachment lip 62 and the hub end 70a of the housing cylinder 70, to the output hub 56. As depicted, a series of teeth 80 may be integrally (or otherwise) formed on an interior circumference of the housing cylinder 70, such that the housing cylinder 70 includes an interior ring gear interface 82. A gear set (e.g., a planetary gear set) utilizing the ring gear interface 82 may then be disposed within the housing cylinder 70 in order to provide an appropriate speed reduction between the rotation of the output shaft 48 (e.g., as powered by the motor 46) and the rotation of the housing cylinder 70 (e.g., as powers rotation of the output hub 56 and, thereby, the relevant external device).

As depicted, the drive assembly 34a includes an example double planetary gear set 84, with sun gears 86 and 88, sets of planet gears 90 and 92, and planet gear carriers 94 and 96. The planet gears 90 are meshed with the sun gear 86 and with the ring gear interface 82. The planet gears 92 are meshed with the sun gear 88 and with the ring gear interface 82. The planet gear carrier 94 is fixed to (e.g., secured to or integrally formed with) the sun gear 88, and the planet gear carrier 96 is fixed to (e.g., secured to or integrally formed with) an axially outer end region of the extended neck 98 of the mounting structure 44, which is spaced axially outwardly from an axially inner end region of the neck 98 on which the bearing assembly 60 is mounted. With such a configuration, the sun gear 88 may be rotated by the planet gear carrier 88, via movement of the planet gears 90 around the sun gear 86, while the axes of rotation of the various planet gears 92 may be fixed in place via the connection between the planet gear carrier 96 and the neck 98. It will be understood, however, that other configurations may be possible. It will also be understood that the disclosed drive assembly may be considered as capable of providing power transmission with a planetary (or other) gear set that excludes a separate ring gear component other than the ring gear interface provided by the housing cylinder. Thus, for example, the planetary gear set may include only one or more of each of a sun gear, planet gears, planet carrier, and or connecting pinion shafts, without a separate ring gear. Alternatively, the planet (or other) gear set may include a separate ring gear in addition to the ring gear(s) formed in the housing cylinder.

With the depicted planetary gear set 84, rotational power may be routed from the motor 46 to the housing cylinder 70 as indicated by the unnumbered arrows of FIG. 2. For example, when the sun gear 86 is rotated by the motor 46 (i.e., via the output shaft 48) rotational power is transmitted by the sun gear 86, through the planet gears 90, both to the sun gear 88 (via the planet gear carrier 94) and to the housing cylinder 70 (via the ring gear interface 82). Rotational power received at the sun gear 88 is further transmitted to the housing cylinder 70 via the planet gears 92 (as facilitated by the fixed connection between the planet gear carrier 96 and the neck 98) and the ring gear interface 82. Due to the attachment between the housing cylinder 70 and the output hub 56 (e.g., as described in greater detail above), rotational power from the housing cylinder 70 may then be transmitted to the output hub 56 and, thereby, to the relevant external device.

As depicted, the ring gear interface 82 is disposed on the housing cylinder 70 such that, when the hub end 70a of the housing cylinder 70 is attached to the output hub 56 via the attachment lip 62, the ring gear interface 82 is not radially aligned (i.e., does not axially overlap) with the attachment lip 62. Further, the planetary gear set 84 is configured such that the various gears 86, 88, 90, and 92 are also not radially aligned with the attachment lip 62, when the housing cylinder 70 is attached to the output hub 56. In other embodiments, other configurations may be possible.

Figure 3:
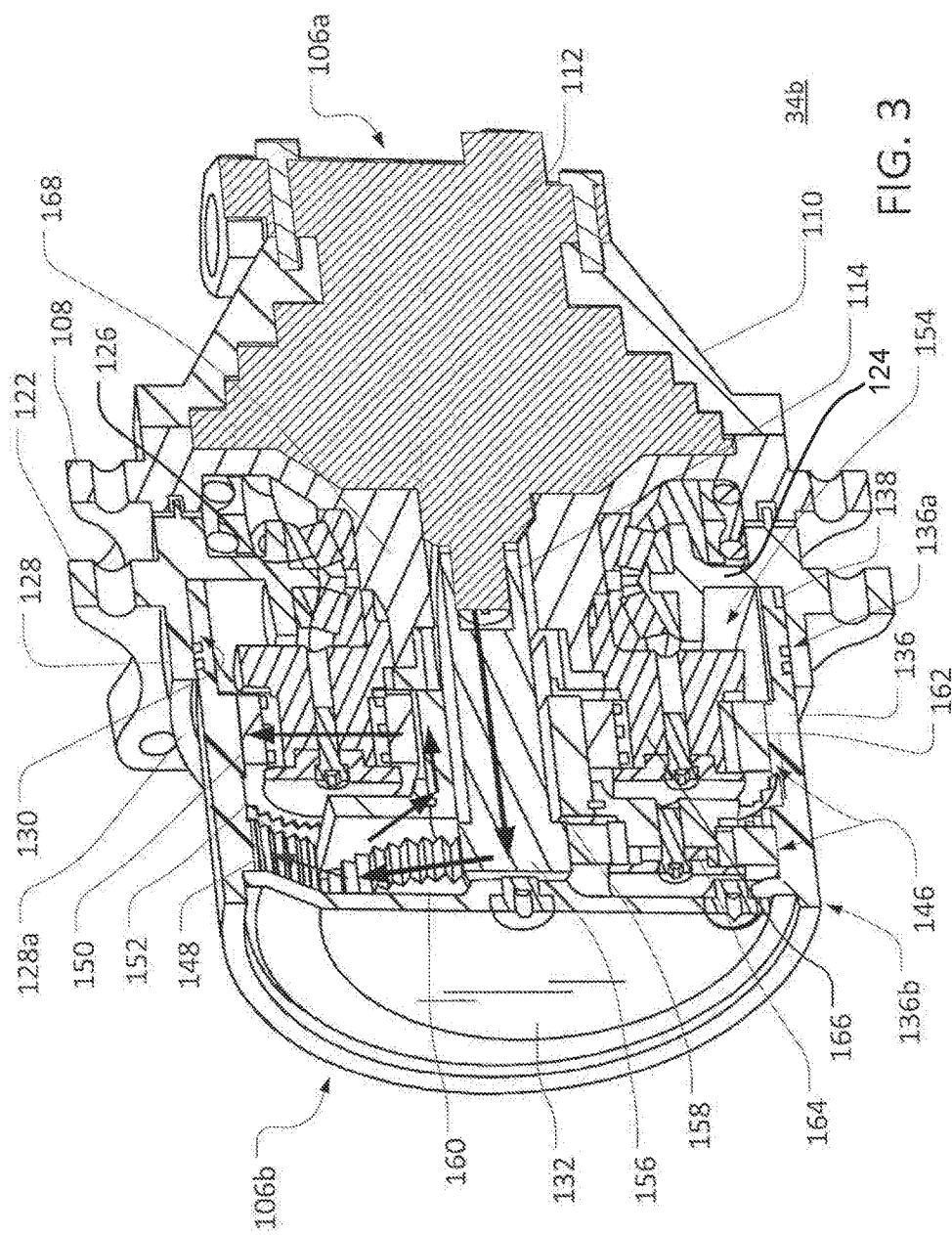
FIG. 3 is a perspective, sectional view of another example drive assembly according to the present disclosure, for use with the vehicle of FIG. 1.

Referring also to FIG. 3, another example configuration of the drive assembly 34 is presented as a drive assembly 34b. Various components (or assemblies) of the drive assembly 34b may generally exhibit radial symmetry. As noted above, in certain embodiments, the disclosed drive assembly may exhibit various radial asymmetries.

As depicted, the drive assembly 34b includes a mounting hub 108 configured for attachment to the frame 36 of the vehicle 30. As such, the drive assembly 34b may be utilized as a final drive assembly for driving the tracks 32 of the vehicle 30. In certain embodiments, the drive assembly 34b (or other similar drive assemblies) may be utilized as a final drive assembly for other vehicles, or as a source of rotational power for various other vehicles or machines.

The mounting hub 108 is included as part of a larger mounting structure 110 for the drive assembly 34b, which may be generally configured to remain relatively stationary during operation of the drive assembly 34b. A motor 112 may be attached to the mounting structure 110 (and, thereby, to the mounting hub 108) at one axial end 106a of the drive assembly 34b (axially inner end when used as shown in FIG. 1), such that the motor 112 may be held in an appropriately stationary orientation for delivery of rotational power to various external devices (e.g., the tracks 32 of FIG. 1). In FIG. 3, the motor 112 is configured as a hydraulic motor with a brake assembly (not shown), and an output shaft 114 extending towards another axial end 106b of the drive assembly 34b (axially outer end when used as shown in FIG. 1). In other embodiments, other configurations may be possible.

The drive assembly 34b may further include an output interface. As depicted, the output interface is configured as an output hub 122, although other configurations may be possible. Generally, the output hub 122 includes a hub body 124, which may extend within the drive assembly 34b and be mounted for rotation about the drive axis of the output shaft 114 by means of a bearing arrangement 126, here shown as a double-row tapered roller bearing, supported by a cylindrical neck 168 of the mounting structure 110 (described in further detail below) extending toward the axial end 106b of the drive assembly 34b. The output hub 122 also includes an attachment lip 128, which extends axially from the hub body 124, towards the axial end 106b of the drive assembly 34b, and has a terminal axial end 128a. Generally, the attachment lip 128 may define an undercut 130, such that an open space is provided radially inside the attachment lip 128.

As depicted, the output hub 122 is configured to engage (directly or indirectly) the tracks 32 of the vehicle 30, such that rotation of the output hub 122 may drive movement of the tracks 32 and, thereby, movement of the vehicle 30. In other embodiments, other output interfaces may be utilized to engage with the tracks 32 or other external devices.

The drive assembly 34b may further include a housing, such as the housing cylinder 136. Generally, the housing of the disclosed drive assembly may be configured to engage with an attachment lip of the relevant output interface, such that rotational power may be transmitted from the housing to the output interface via co-rotation (i.e., rotation in unison) of the housing and the output interface. As depicted, for example, the housing cylinder 136 includes a hub end 136a, which is configured to attach to the output hub 122 via the attachment lip 128. The housing cylinder 136 also includes a cap end 136b, to which an end cap 132 is attached.

The hub end 136a of the housing cylinder 136 may be configured to attach to the attachment lip 128 in various ways, as discussed in greater detail below. In certain embodiments, an inner diameter of the attachment lip 128 and an outer diameter of the hub end 136a of the housing cylinder 136 may be configured such that an appropriately strong diametral interference (e.g., press) fit may be formed between the housing cylinder 136 and the output hub 122, when the hub end 136a of the housing cylinder 136 is inserted into the undercut 130 (i.e., is surrounded by the attachment lip 128). In certain embodiments, shrink fit techniques may be utilized. For example, the attachment lip 128 may be expanded radially outward through heating, and the hub end 136a of the housing cylinder 136 may be inserted into the undercut 130. As the attachment lip 128 cools, an appropriately strong attachment may be thereby formed between the housing cylinder 136 and the output hub 122. In certain embodiments, the attachment lip 128 or the housing cylinder 136 may be manufactured with self-cutting splines (see, e.g., FIGS. 6A and 6B), such that a splined connection between the housing cylinder 136 and the output hub 122 may be formed when the hub end 136a of the housing cylinder 136 is inserted into the undercut 130.

In certain embodiments, a groove or chamfer may be provided on the attachment lip 128 or the hub end 136a of the housing cylinder 136. For example, a groove or chamfer may be provided at an end of the attachment lip 128 or housing cylinder 136 that is closer to the end 106a of the drive assembly 34b. This may be useful, for example, in order to capture debris that is generated during the cutting of a splined interface, where one of the housing cylinder 136 or the attachment lip 128 includes self-cutting splines. As depicted, for example, a groove 138 is provided in the housing cylinder 136 at an end closer to the end 106a of the drive assembly 34b. In other embodiments, other configurations may be possible.

As depicted, the undercut 130 defined by the attachment lip 128 provides a point of insertion for the hub end 136a of the housing cylinder 136. The housing cylinder 136 may accordingly be attached to the mounting hub 108 by inserting the hub end 136a of the housing cylinder 136 into the undercut 130, with the attachment lip 128 generally surrounding (i.e., being radially aligned with and outside of) the hub end 136a of the housing cylinder 136. In certain embodiments, a somewhat reversed configuration (not shown) may be utilized. For example, the hub end 136a of the housing cylinder may be configured to slide over (i.e., radially outside of) the attachment lip 128 in order to attach the housing cylinder 136 to the output hub 122. As such, in certain embodiments, the output hub 122 may be attached to the housing cylinder 136 with the hub end 136a of the housing cylinder generally surrounding (i.e., being radially aligned with and outside of) the attachment lip 128. In such a configuration, similar attachment means and other considerations discussed above may apply, but with an inner surface of the housing cylinder 136 contacting an outer surface of the attachment lip 128, rather than vice versa.

In certain embodiments, the output hub 122 and the housing cylinder 136 may be formed from different materials, or may be formed in different ways. For example, the output hub 122 may be formed from cast iron, whereas the housing cylinder 136 may be formed from steel (or other metal) tubing. This may result in relatively significant reduction in costs as compared to known drive assembly designs.

Rotational power may be transmitted in various ways from the motor 112 to the housing cylinder 136 and thereby, via the attachment between the attachment lip 128 and the hub end 136a of the housing cylinder 136, to the output hub 122. As depicted, distinct sets of teeth 146 may be integrally (or otherwise) formed on an interior circumference of the housing cylinder 136, such that the housing cylinder 136 includes distinct interior ring gear interfaces 148 and 150, separated by a toothless region 152. A gear set (e.g., a planetary gear set) utilizing the ring gear interfaces 148 and 150 may then be disposed within the housing cylinder 136 in order to provide an appropriate speed reduction between the rotation of the output shaft 114 (e.g., as powered by the motor 112) and the rotation of the housing cylinder 136 (e.g., which powers rotation of the output hub 122 and, thereby, the relevant external device).

As depicted, the drive assembly 34b includes an example double planetary gear set 154, with sun gears 156 and 158, sets of planet gears 160 and 162, and planet gear carriers 164 and 166. The planet gears 160 are meshed with the sun gear 156 and with the ring gear interface 148. The planet gears 162 are meshed with the sun gear 158 and with the ring gear interface 150. The planet gear carrier 164 is fixed to (e.g., secured to or integrally formed with) the sun gear 158, and the planet gear carrier 166 is fixed to (e.g., secured to or integrally formed with) an extended neck 168 of the mounting structure 110. With such a configuration, the sun gear 158 may be rotated by the planet gear carrier 158, via movement of the planet gears 160 around the sun gear 156, while the axes of rotation of the various planet gears 162 may be fixed in place via the connection between the planet gear carrier 166 and the neck 168. It will be understood, however, that other configurations may be possible.

With the depicted planetary gear set 154, rotational power may be routed from the motor 112 to the housing cylinder 136 as indicated by the unnumbered arrows of FIG. 3. For example, when the sun gear 156 is rotated by the motor 112 (i.e., via the output shaft 114) rotational power is transmitted by the sun gear 156, through the planet gears 160, both to the sun gear 158 (via the planet gear carrier 164) and to the housing cylinder 136 (via the ring gear interface 148). Rotational power received at the sun gear 158 is further transmitted to the housing cylinder 136 via the planet gears 162 (as facilitated by the fixed connection between the planet gear carrier 166 and the neck 168) and the ring gear interface 150. Due to the attachment between the housing cylinder 136 and the output hub 122 (e.g., as described in greater detail above), rotational power from the housing cylinder 136 may then be transmitted to the output hub 122 and, thereby, to the relevant external device.

As depicted, the ring gear interfaces 148 and 150 are disposed on the housing cylinder 136 such that, when the hub end 136a of the housing cylinder 136 is attached to the output hub 122 via the attachment lip 128, the ring gear interfaces 148 and 150 are not radially aligned (i.e., do not axially overlap) with the attachment lip 128. Further, the planetary gear set 154 is configured such that the various gears 156, 158, 160, and 162 are also not radially aligned with the attachment lip 128, when the housing cylinder 136 is attached to the output hub 122. In other embodiments, other configurations may be possible.

Figure 4:
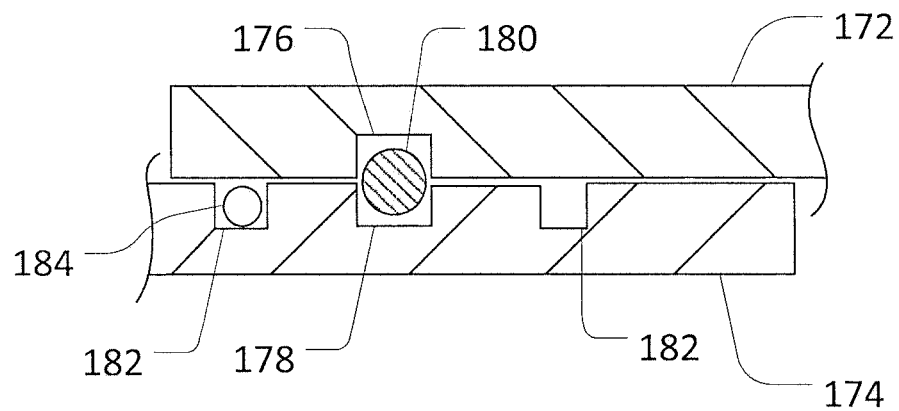
FIG. 4 is partial side sectional view of an example attachment structure for a housing and output hub of either of the drive assemblies of FIGS. 3 and 4.

Referring also to FIG. 4, a schematic sectional view is presented of the interface between another example attachment lip 172 (e.g., similar to the attachment lip 62 of FIG. 2) and another example housing cylinder 174 (e.g., similar to the housing cylinder 70 of FIG. 2). As depicted, the attachment lip 172 includes a groove 176 that corresponds to a similar groove 178 in the housing cylinder 174. A retaining ring 180 (e.g., a snap ring) may be seated in the grooves 176 and 178 when the housing cylinder 174 is attached to the attachment lip 172, such that the retaining ring 180 may provide axial retention force (e.g., left to right, as depicted in FIG. 4) for the relevant drive assembly.

As depicted the housing cylinder 174 also includes grooves 182 for o-rings 184 (or other seals), as may be useful to ensure an appropriate fluid seal between the internal cavity of the relevant drive assembly and the ambient environment. It will be understood that other configurations may be possible. For example, in certain embodiments, a different number of grooves and seals may be provided, or the grooves and seals may be disposed at different axial locations along the contact area between the housing cylinder 174 and the attachment lip 172. In certain embodiments, similar (or other) grooves and seals (not shown) may be provided on the attachment lip 172 instead of (or in addition to) on the housing cylinder 174.

Figure 5:
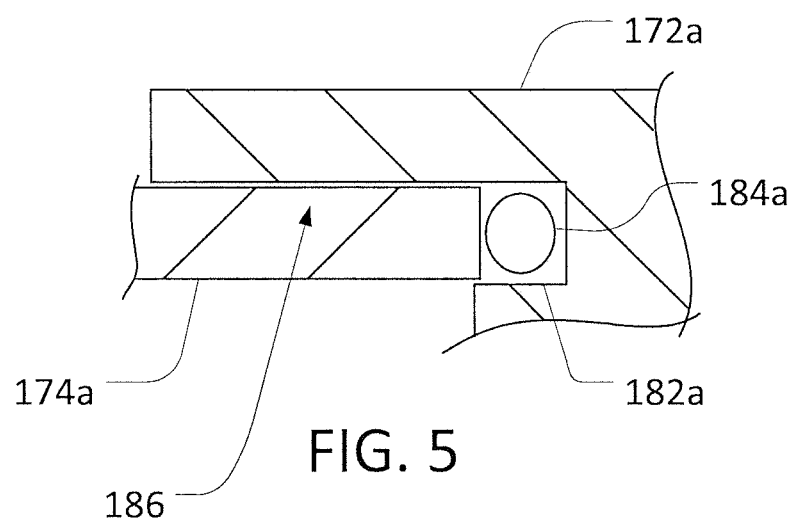
FIG. 5 is a partial side view of another example attachment structure for a housing and output hub of either of the drive assemblies of FIGS. 3 and 4.

In certain embodiments, sealing bodies, such as o-rings, may be disposed at other locations. As depicted in FIG. 5, for example, a groove 182a may be provided at the axial inner end of an undercut 186 of an attachment lip 172a, with the groove 182a sized to receive an o-ring 184a. When a housing cylinder 174a is inserted into the undercut 186, the axial end of the housing cylinder 174a may press against the o-ring 184a in order to provide a seal. In other embodiments, a similar groove (not shown) may be provided in the axial end of the housing cylinder 174a, such that the o-ring 184a may be seated within a groove on the housing cylinder 174a rather than (or in addition to) being seated within the groove 182a at the end of the undercut 186.

Figure 6A:
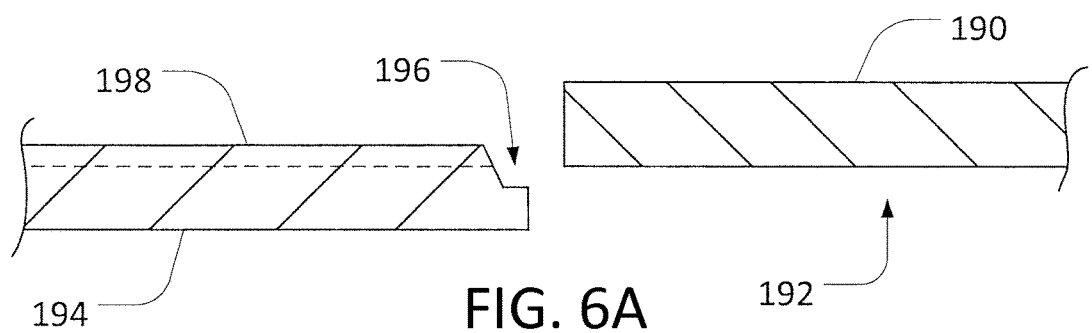
FIGS. 6A and 6B are partial side sectional views of another example attachment structure for the housing and output hub of either of the drive assemblies of FIGS. 3 and 4, shown disassembled in FIG. 6A.
Figure 6B:
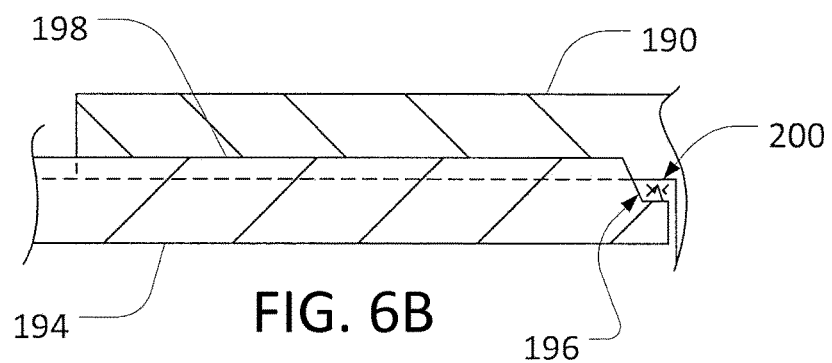

Referring also to FIGS. 6A and 6B, a schematic sectional view is presented of the interface between still another example attachment lip 190 with an undercut 192 (e.g., similar to the attachment lip 128 of FIG. 3) and another example housing cylinder 194 (e.g., similar to the housing cylinder 136 of FIG. 3). As depicted, the housing cylinder 194 includes a self-cutting spline 198, which may cut into the attachment lip 190 when the housing cylinder 194 is inserted into the undercut 192 (see FIG. 6B). In this way, a splined connection may be formed between the housing cylinder 194 and the attachment lip 190, without the need to separately form splines on the attachment lip 190 before insertion of the housing cylinder 194 into the undercut 192.

Also as depicted, the housing cylinder 194 includes a chamfered groove 196 at one axial end (i.e. to the right in FIGS. 6A and 6B). This may be useful, for example, in order to capture various chips and other debris 200 that may be formed when the attachment lip 190 is cut by the self-cutting spline 198.

Figure 7:
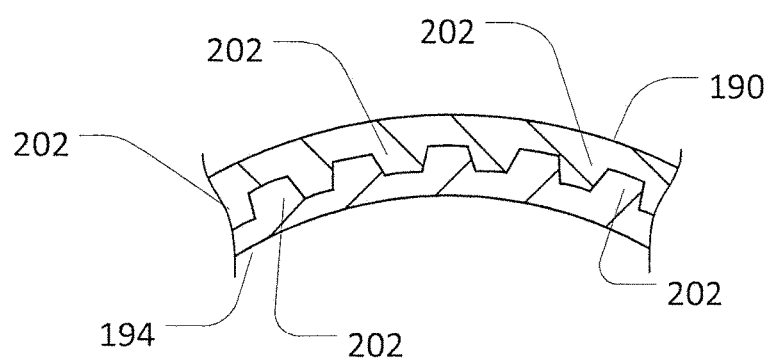
FIG. 7 is a partial end sectional view of the example attachment structure of FIGS. 6A and 6B.

An example of the splined connection formed between the housing cylinder 194 and the attachment lip 190 is depicted in FIG. 7. As depicted, the connection includes various involute splines 202. It will be understood, however, that other configurations may be possible. In certain embodiments, splines may be formed on the attachment lip 190 before the housing cylinder 194 is inserted into the undercut 192. In certain embodiments, self-cutting splines (not shown) may be included on the attachment lip 190, such that splines may be cut on the housing cylinder 194 by the attachment lip 190, when the housing cylinder 194 is inserted into the undercut 192.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for transferring power to an external device, the drive assembly comprising:
    a housing cylinder mounted for rotation about a drive axis and having a cap end and an attachment end disposed entirely at an opposite end of the housing cylinder from the cap end, with the attachment end including an annular first attachment surface, and gear teeth disposed around an inner circumference of the housing cylinder to form at least one ring gear;
    a planetary gear set surrounded, at least in part, by the housing cylinder, and including at least one sun gear and at least one set of planet gears supported by at least one planet gear carrier, rotated by the at least one sun gear and meshed with the at least one ring gear;
    an output interface having an annular attachment lip extending axially and including an annular second attachment surface overlapping and being in contact only with the first attachment surface, with an axial end of the attachment lip terminating radially adjacent the first attachment surface;
    a connection being established between the annular first and second attachment surfaces wherein the housing cylinder is attached for transferring rotation to the attachment lip during operation of the drive assembly; and
    wherein rotational power is transmitted from the planetary gear set to the output interface, via the gear teeth and the connection between the first and second attachment surfaces, in order to drive the external device.

2. The drive assembly of claim 1, wherein one of the first and second attachment surfaces includes a self-cutting spline interface, such that when the housing cylinder is attached to the attachment lip for operation of the drive assembly, the connection between the first and second attachment surfaces is formed as a splined connection between the attachment end of the housing cylinder and the attachment lip.

3. The drive assembly of claim 2, wherein the one of the attachment lip and the attachment end of the housing cylinder includes at least one of a chamfer and a groove to receive debris generated by formation of the splined connection.

4. The drive assembly of claim 1, wherein the planetary gear set is a double planetary gear set including first and second sun gears, and first and second sets of planet gears.

5. The drive assembly of claim 4, wherein each of the first and second sets of planet gears is meshed with the at least one ring gear of the housing cylinder.

6. The drive assembly of claim 5, wherein the at least one ring gear is arranged in at least two distinct sets of gear teeth, the at least two distinct sets of gear teeth being separated by an axial gap; and
    wherein the first set of planet gears is meshed with a first of the at least two distinct sets of gear teeth and the second set of planet gears is meshed with a second of the at least two distinct sets of gear teeth.

7. The drive assembly of claim 1, wherein, when the housing cylinder is attached to the attachment lip for operation of the drive assembly, the gear teeth of the housing cylinder are axially spaced from the axial end of the attachment lip, such that the gear teeth are axially spaced from the attachment lip.

8. The drive assembly of claim 1, wherein the connection between the first attachment surface of the housing cylinder and the second attachment surface of the attachment lip is provided by one of an interference fit connection and a shrink fit connection between the attachment end of the housing cylinder and the attachment lip.

9. The drive assembly of claim 1, further comprising:
    a mounting structure; and
    a motor attached to the mounting structure and configured to provide rotational power to the planetary gear set;
    wherein the output interface rotates with respect to the mounting structure to drive the external device.

10. A drive assembly for transferring power to an external device, the drive assembly comprising:
    a mounting structure defining a mounting hub and an axially projecting cylindrical neck, an output hub mounted for rotation about the cylindrical neck and a housing cylinder respectively mounted in series along a drive axis of the drive assembly between opposite first and second axial ends of the drive assembly, with the mounting structure being adjacent the first axial end, the housing cylinder being adjacent the second axial end and the output hub being between the mounting hub and the housing cylinder;

the housing cylinder having at least one ring gear integrally formed around an inner circumference of the housing cylinder, wherein a hub end of the housing cylinder has a radially outer annular surface spaced axially away from the ring gear towards the first end of the drive assembly;

a planetary gear set surrounded, at least in part, by the housing cylinder, and including at least one sun gear and at least one set of planet gears supported by at least one planet gear carrier and being meshed with the at least one sun gear and with the at least one ring gear of the housing cylinder; and the output hub including a radially extending hub body and an annular attachment lip extending axially away from the hub body, toward the second end of the drive assembly, and having an axial end and an annular, radially inner surface defining an undercut;

wherein the housing cylinder is attached to the attachment lip for operation of the drive assembly with the hub end of the housing cylinder disposed within the undercut, such that the inner surface of the attachment lip contacts the outer surface of the hub end of the housing cylinder with a connection being established between the inner surface of the attachment lip and the outer surface of the hub end of the housing cylinder to secure the housing cylinder to the output hub, and with the planetary gear set disposed, at least in part, axially between the axial end of the attachment lip and the second end of the drive assembly; and wherein rotational power is transmitted from the planetary gear set to the output hub via the at least one ring gear and the connection between the outer surface of the hub end of the housing cylinder and the inner surface of the attachment lip, such that the housing cylinder and output hub rotate in unison to drive the external device.

11. The drive assembly of claim 10, wherein one of the outer surface of the hub end of the housing cylinder and the inner surface of the attachment lip includes a self-cutting spline interface, such that when the hub end of the housing cylinder is moved axially into the undercut, the connection between the outer surface of the hub end of the housing cylinder and the inner surface of the attachment lip is formed as a splined connection between the hub end of the housing cylinder and the attachment lip.

12. The drive assembly of claim 11, wherein the one of the attachment lip and the hub end of the housing cylinder includes at least one of a chamfer and a groove to receive debris generated by formation of the splined connection.

13. The drive assembly of claim 10, wherein the planetary gear set is a double planetary gear set including first and second sun gears, and first and second sets of planet gears.

14. The drive assembly of claim 13, wherein each of the first and second sets of planet gears is meshed with the at least one ring gear of the housing cylinder.

15. The drive assembly of claim 14, wherein the at least one ring gear includes at least two distinct sets of gear teeth, the at least two distinct sets of gear teeth being separated by an axial gap; and wherein the first set of planet gears is meshed with a first of the at least two distinct sets of gear teeth and the second set of planet gears is meshed with a second of the at least two distinct sets of gear teeth.

16. The drive assembly of claim 10, wherein the at least one ring gear is disposed between the axial end of the attachment lip and the second end of the drive assembly, such that the at least one ring gear is axially spaced from the undercut.

17. The drive assembly of claim 10, wherein the connection between the outer surface of the hub end of the housing cylinder and the inner surface of the attachment lip is provided by one of an interference fit connection and a shrink fit connection between the hub end of the housing cylinder and the attachment lip.

18. The drive assembly of claim 10, further comprising:
a motor attached to the mounting hub and configured to provide rotational power to the planetary gear set;
wherein the output hub rotates with respect to the mounting hub to drive the external device.

19. A drive assembly for a final drive of a work vehicle, the drive assembly comprising:
a mounting hub configured to secure to a frame of the vehicle;
a motor attached to the mounting hub, the motor having an output shaft;
a housing cylinder having at least one ring gear integrally formed around an inner circumference of the housing cylinder, wherein a hub end of the housing cylinder extends axially away from the at least one ring gear towards a first end of the drive assembly and has a radially outer surface;
a planetary gear set including at least one set of planet gears supported by at least one planet gear carrier, and including at least one sun gear receiving rotational power from the output shaft of the motor, the planet gears being meshed with the at least one sun gear and with the at least one ring gear of the housing cylinder;
an output hub with a hub body, and with an annular attachment lip extending away from the hub body, toward a second end of the drive assembly, to an axial end of the attachment lip, with a radially inner surface of the attachment lip defining an undercut;
wherein the housing cylinder is attached to the attachment lip for operation of the drive assembly with the hub end of the housing cylinder disposed within the undercut, such that the inner surface of the attachment lip contacts the outer surface of the hub end of the housing cylinder to secure the housing cylinder to the output hub, and with the planetary gear set disposed, at least in part, axially between the axial end of the attachment lip and the second end of the drive assembly; and
wherein rotational power is transmitted from the planetary gear set to the output hub, via the at least one ring gear and contact between the outer surface of the hub end of the housing cylinder and the inner surface of the attachment lip, such that the housing cylinder and output hub rotate in unison to provide motive power for the work vehicle.

20. The drive assembly of claim 19, wherein the at least one set of planet gears includes first and second sets of planet gears, the at least one sun gear includes first and second sun gears, and wherein the second set of planet gears is meshed with the at least one ring gear and the second sun gear;
wherein the at least one planet gear carrier is one of attached to and integrally formed with the second sun gear, such that rotation of the first set of planet gears around the first sun gear rotates the second sun gear via the at least one planet gear carrier; and wherein each of the first and second sets of planet gears transmits rotational power from the motor to the at least one ring gear and, thereby, to the output hub.

21. A drive assembly for transferring power to an external device, the drive assembly comprising:
a housing cylinder having a cap end, an attachment end with a first attachment surface, and gear teeth disposed around an inner circumference of the housing cylinder to form at least one ring gear;
a double planetary gear set surrounded, at least in part, by the housing cylinder, and including first and second sun gears, and first and second sets of planet gears, and each of the first and second sets of planet gears being supported by at least one planet gear carrier, rotated by at least one of said first and second sun gears and meshed with the at least one ring gear of the housing cylinder; and
an output interface with an annular attachment lip extending toward the cap end of the housing cylinder to an axial end of the attachment lip;
wherein the housing cylinder is attached to the attachment lip for operation of the drive assembly via a second attachment surface on the attachment lip contacting the first attachment surface to secure the housing cylinder to the output interface, with the cap end of the housing cylinder extending axially past the axial end of the attachment lip such that the cap end of the housing cylinder is not radially aligned with the attachment lip; and
wherein rotational power is transmitted from the planetary gear set to the output interface, via the gear teeth and the contact between the first and second attachment surfaces, in order to drive the external device.

22. The drive assembly of claim 21, wherein one of the first and second attachment surfaces includes a self-cutting spline interface, such that when the housing cylinder is attached to the attachment lip for operation of the drive assembly, a splined connection is formed between the attachment end of the housing cylinder and the attachment lip.

23. The drive assembly of claim 22, wherein the one of the attachment lip and the attachment end of the housing cylinder includes at least one of a chamfer and a groove to receive debris generated by formation of the splined connection.

24. The drive assembly of claim 21 wherein the at least one ring is arranged in at least two distinct sets of gear teeth, the at least two distinct sets of gear teeth being separated by an axial gap; and
wherein the first set of planet gears is meshed with a first of the at least two distinct sets of gear teeth and the second set of planet gears is meshed with a second of the at least two distinct sets of gear teeth.

25. The drive assembly of claim 21, wherein, when the housing cylinder is attached to the attachment lip for operation of the drive assembly, the gear teeth of the housing cylinder are axially spaced from the axial end of the attachment lip, such that the gear teeth are radially misaligned relative to the attachment lip.

26. The drive assembly of claim 21, wherein the connection between the first attachment surface of the housing cylinder and the second attachment surface of the attachment lip is provided by one of an interference fit connection and a shrink fit connection between the attachment end of the housing cylinder and the attachment lip.

27. The drive assembly of claim 21, further comprising:
a mounting interface; and
a motor attached to the mounting interface and configured to provide rotational power to the planetary gear set;
wherein the output interface rotates with respect to the mounting interface to drive the external device.

28. A drive assembly for transferring power to an external device, the drive assembly comprising:
a housing cylinder having at least one ring gear integrally formed around an inner circumference of the housing cylinder, wherein a hub end of the housing cylinder has a radially outer surface and extends axially away from the ring gear towards a first end of the drive assembly;
a planetary gear set surrounded, at least in part, by the housing cylinder, and including at least one sun gear and at least one set of planet gears supported by at least one planet gear carrier and being meshed with the at least one sun gear and with the at least one ring gear of the housing cylinder; and
an output hub with a hub body, and with an annular attachment lip extending away from the hub body, toward a second end of the drive assembly, to an axial end of the attachment lip, with a radially inner surface of the attachment lip defining an undercut;
wherein the housing cylinder is attached to the attachment lip for operation of the drive assembly with the hub end of the housing cylinder disposed within the undercut, A drive assembly for transferring power to an external device, the drive assembly comprising:
a housing cylinder having at least one ring gear integrally formed around an inner circumference of the housing cylinder, wherein a hub end of the housing cylinder has a radially outer surface and extends axially away from the ring gear towards a first end of the drive assembly;
a planetary gear set surrounded, at least in part, by the housing cylinder, and including at least one sun gear and at least one set of planet gears supported by at least one planet gear carrier and being meshed with the at least one sun gear and with the at least one ring gear of the housing cylinder; and
an output hub with a hub body, and with an annular attachment lip extending away from the hub body, toward a second end of the drive assembly, to an axial end of the attachment lip, with a radially inner surface of the attachment lip defining an undercut;
wherein the housing cylinder is attached to the attachment lip for operation of the drive assembly with the hub end of the housing cylinder disposed within the undercut, such that the inner surface of the attachment lip contacts the outer surface of the hub end of the housing cylinder, wherein one of the outer surface of the hub end of the housing cylinder and the inner surface of the attachment lip includes a self-cutting spline interface, such that when the hub end of the housing cylinder is moved axially into the undercut, a splined connection is formed between the hub end of the housing cylinder and the attachment lip to secure the housing cylinder to the output hub, and wherein the one of the attachment lip and the hub end of the housing cylinder includes at least one of a chamfer and a groove to receive debris generated by formation of the splined connection;
and with the planetary gear set disposed, at least in part, axially between the axial end of the attachment lip and the second end of the drive assembly; and
wherein rotational power is transmitted from the planetary gear set to the output hub via the at least one ring gear and the splined connection between the outer surface of the hub end of the housing cylinder and the inner surface of the attachment lip, such that the housing cylinder and output hub rotate in unison to drive the external device.

29. The drive assembly of claim 28, further comprising:
a mounting hub; and
a motor attached to the mounting hub and configured to provide rotational power to the planetary gear set;
wherein the output hub rotates with respect to the mounting hub to drive the external device.

* * * * *